US011157509B2

(12) United States Patent
Gujarathi

(10) Patent No.: US 11,157,509 B2
(45) Date of Patent: Oct. 26, 2021

(54) METHODS FOR ENHANCING A LEGACY SINGLE TENANT APPLICATION SYSTEM TO A MULTI-TENANT APPLICATION SYSTEM WITH MINIMAL CHANGES

(71) Applicant: Citrix Systems, Inc., Fort Lauderdale, FL (US)

(72) Inventor: Ashish Gujarathi, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 139 days.

(21) Appl. No.: 15/963,841

(22) Filed: Apr. 26, 2018

(65) Prior Publication Data
US 2018/0314746 A1 Nov. 1, 2018

Related U.S. Application Data

(60) Provisional application No. 62/490,892, filed on Apr. 27, 2017.

(51) Int. Cl.
*G06F 16/25* (2019.01)
*G06F 9/54* (2006.01)
(Continued)

(52) U.S. Cl.
CPC ............ *G06F 16/258* (2019.01); *G06F 9/547* (2013.01); *G06F 16/40* (2019.01); *G06F 16/90* (2019.01);
(Continued)

(58) Field of Classification Search
CPC .... G06F 16/258; G06F 16/40; G06F 16/9014; G06F 16/9566; G06F 16/90; G06F 9/547; G06F 8/76; H04L 67/02
See application file for complete search history.

(56) References Cited

U.S. PATENT DOCUMENTS 7,617,498 B1 * 11/2009 Lumsden .................. G06F 9/52
707/999.1
8,356,274 B2 * 1/2013 Kwok ..................... G06Q 10/10
717/101

(Continued)

OTHER PUBLICATIONS

International Search Report and Written Opinion for International Appl. No. PCT/US2018/029618, dated Jul. 11, 2018.
(Continued)

*Primary Examiner* — Alford W Kindred
*Assistant Examiner* — Tiffany Thuy Bui
(74) *Attorney, Agent, or Firm* — Foley & Lardner LLP

(57) ABSTRACT

Systems and methods for accessing single-tenant databases comprising a multi-tenant aware cluster manager in communication with instances of single-tenant databases are described. The cluster manager can establish a uniform resource locator (URL) unique for each tenant to access the cluster manager. Each of the instances of single-tenant databases can include data for a corresponding tenant. The cluster manager can receive a request from a client to access a database corresponding to the first tenant. The request can include the URL established for the first tenant. The cluster manager can identify the first tenant based on the URL of the request. The cluster manager can obtain, responsive to identification of the first tenant, a tenant context of the first tenant from a storage. The cluster manager can access, using the first tenant context and responsive to the request, a first instance of the single-tenant databases corresponding to the first tenant.

12 Claims, 8 Drawing Sheets

(51) Int. Cl.
  *H04L 29/08* (2006.01)
  *G06F 16/901* (2019.01)
  *G06F 16/955* (2019.01)
  *G06F 16/90* (2019.01)
  *G06F 16/40* (2019.01)
  *G06F 8/76* (2018.01)

(52) U.S. Cl.
  CPC ...... *G06F 16/9014* (2019.01); *G06F 16/9566* (2019.01); *H04L 67/02* (2013.01); *G06F 8/76* (2013.01)

(56) References Cited

U.S. PATENT DOCUMENTS

| | | | |
|---|---|---|---|
| 9,772,835 B1* | 9/2017 | Trautmann | G06F 9/455 |
| 2011/0225165 A1* | 9/2011 | Burstein | G06F 16/2272 |
| | | | 707/741 |
| 2011/0231480 A1* | 9/2011 | Miyazaki | H04L 45/00 |
| | | | 709/203 |
| 2013/0024910 A1* | 1/2013 | Verma | H04L 63/08 |
| | | | 726/3 |
| 2013/0036407 A1* | 2/2013 | Zheng | G06F 11/0781 |
| | | | 717/135 |
| 2014/0164318 A1 | 6/2014 | Tsai et al. | |
| 2014/0181013 A1* | 6/2014 | Micucci | G06F 16/90 |
| | | | 707/610 |
| 2014/0207801 A1* | 7/2014 | Palmert | G06F 16/24578 |
| | | | 707/749 |
| 2015/0006730 A1 | 1/2015 | Helfman et al. | |
| 2015/0089066 A1 | 3/2015 | Meswani et al. | |
| 2015/0264002 A1* | 9/2015 | Vlachogiannis | H04L 51/18 |
| | | | 709/206 |
| 2016/0028833 A1 | 1/2016 | Georgieva | |
| 2016/0034277 A1* | 2/2016 | Syed | G06F 8/76 |
| | | | 717/136 |
| 2016/0094486 A1* | 3/2016 | Sahoo | G06F 8/60 |
| | | | 709/226 |
| 2016/0149882 A1* | 5/2016 | Srivastava | H04L 63/08 |
| | | | 726/4 |
| 2016/0261684 A1 | 9/2016 | Khalaf et al. | |
| 2018/0278675 A1* | 9/2018 | Thayer | G06F 9/45558 |

OTHER PUBLICATIONS

Examination Report on EP Appl. No. 18725364.6 dated May 12, 2021.

Meints, Willem: "Make your Spring Boot application multi-tenant aware in 2 steps", Willem's Fizzy Logic, Jan. 24, 2016 (Jan. 24, 2016), XP055802448, Retrieved from the Internet: URL:https://fizzylogic.nl/2016/01/24/make-your-spring-boot?application-multi-tenant-aware-in-2-steps [retrieved on May 7, 2021].

* cited by examiner

METHODS FOR ENHANCING A LEGACY SINGLE TENANT APPLICATION SYSTEM TO A MULTI-TENANT APPLICATION SYSTEM WITH MINIMAL CHANGES

CROSS-REFERENCE TO RELATED APPLICATIONS

The present application claims priority to and the benefit of U.S. Provisional Patent Application No. 62/490,892, filed on Apr. 27, 2017, and titled "METHODS FOR ENHANCING A LEGACY SINGLE TENANT APPLICATION SYSTEM TO A MULTI-TENANT APPLICATION SYSTEM WITH MINIMAL CHANGES", which is incorporated herein by reference in its entirety for all purposes.

FIELD OF THE DISCLOSURE

The present application generally relates to large scale computer applications. In particular, the present application relates to systems and methods for efficiently converting a large single-tenant system to a multi-tenant system.

BACKGROUND OF THE DISCLOSURE

Computing systems can be very complex. For example, some computer applications that execute on computer systems may include thousands or millions of lines of code, which, for object-oriented programming languages, may define hundreds, thousands, or millions of classes, methods, objects, variables, and databases. The classes, methods, objects, variables, and databases making up a computer application are typically interrelated in complicated ways. As a result, the changes to the underlying code required to alter the basic functionality of a computer system may be prohibitively complicated, expensive, and time-consuming to implement. It can therefore be very difficult to convert a single-tenant system to a multi-tenant system.

BRIEF SUMMARY OF THE DISCLOSURE

This disclosure describes patterns that can be used for converting a large legacy single-tenant system into a multi-tenant system, while minimizing changes to the code-base of the original single-tenant system. The techniques described in further detail below also can facilitate easier migrations from a single-tenant system to a multi-tenant system. In general, a tenant may be a customer organization, such as a business or other entity, which makes use of a system, for example via a subscription to the system or to a service provided by the system.

The techniques described in this disclosure can be particularly useful for modifying large, complex applications or computing systems that initially only support single-tenancy. Such applications and systems may include thousands or millions of lines of code, which, for object-oriented programming languages, may define hundreds, thousands, or millions of classes, methods, objects, variables, and databases that can be interrelated in complicated ways. In some implementations, such an application may be a mobile device management (MDM) application, a mobile application management (MAM) application, a mobile content management (MCM) application, or any other type or form of enterprise mobility management software or system. For example, such a product may have initially been developed to be deployed as a single-tenant application on-premises at a physical site owned or otherwise managed by an end user (e.g., a business entity or other organization). However, due to changes in the marketplace for such products, there may be customer demand for a similar system that is deployed remotely (e.g., cloud-based or otherwise distributed across a computer network, such as the Internet). There also may be demand for such a system that supports multi-tenancy functionality. Described further below are concepts that can allow an existing single-tenant application or system to be converted into an application or system that supports multi-tenancy (sometimes also referred to as a "tenant-aware" system). In some implementations, a single instance of such an application or system can be modified such that it can service multiple tenants that remain isolated from one another. The modifications as described in this disclosure can reduce the number of code changes and the level of risk involved in the transition from a single-tenant environment to a multi-tenant environment.

The present disclosure describes a variety of techniques for the efficient conversion from a single-tenant system to a multi-tenant system. For example, an application tier of the initial system can be made multi-tenant, while a data tier remains single-tenant. This can reduce the engineering effort required for the conversion, while still enabling easy migrations to a multi-tenant system for a customer or other end user. In some implementations, existing application programming interface (API) parameters for the legacy single-tenant application can be used for determining tenant context (e.g., an identification of a particular one of multiple tenants associated with an API request) in the multi-tenant application. As a result, no new parameters for the API are required. In some implementations, the tenant context in the multi-tenant system can be propagated throughout the system using thread-local storage. In addition, wrapper classes or containers (or both) can be introduced. The wrapper classes and containers can be tenant-aware, and can require only relatively small changes to the existing code of the single-tenant system, as compared to the relatively larger changes that may be required if conventional classes were used to convert the single-tenant system to a multi-tenant system.

In some implementations, the architecture for multi-tenancy can involve a single instance of an application that can multiplex across multiple databases based on a plurality of tenants to support multi-tenant functionality. With this approach, changes to the database schema can be reduced. For example, there may be no need to modify the database schema to require a tenant identifier for each of the plurality of tenants. This can also allow for the migration of a legacy single-tenant environment to a multi-tenant environment without having to build complex migration tools.

As described briefly above, tenant identification may not require any additional parameters (e.g., a tenant identification parameter) to be included in every API request. Instead, a header included in the API request, such as a hypertext transfer protocol (HTTP) host header, can be used to identify the respective tenant associated with the request. In some implementations, this can be achieved by providing each tenant with a unique uniform resource locator (URL). In some implementations, a tenant making an API request is still required to provide other appropriate credentials for accessing an API at its respective URL. Thus, this approach does not require a change to the API, thereby eliminating any need to modify any client-side applications that may make use of the existing API.

Many large software applications include multiple layers of code that are invoked in order to service an API request. For a multi-tenant system, the tenant context (e.g., an identification of the particular tenant associated with an API request) may be required by more than one layer of code, so that the actions of the API request can be performed in the context of the correct tenant. The tenant context also can be required for simple tasks like logging messages that are to be tagged with the right tenant identifier. However, changing the API signatures of all of the layers of code to pass in the tenant context information can be difficult. To address this issue, in some implementations, the tenant context for an API request can be stored in thread-local storage at the entry point (e.g., the first layer of code invoked during the API request) such that it can be retrieved easily by any of the code present in the other layers of the application during the processing of the API request.

Some large applications make frequent use of standard collections or other data structures, such as HashMaps, Lists, Queues, and Stacks. For example, such data structures may be useful for saving and/or tracking variables in memory. Typically, these are singleton objects that save and/or track the state for a tenant. Thus, in a multi-tenant environment, multiple instances of these objects may be required, and therefore additional code must be written to manage the lifecycle of these instances, as well as for finding the right instance based on the tenant context. This results in increased engineering effort, as well as increased risk for introducing regressions when converting to a multi-tenant system. However, engineering effort and risk level can both be reduced using the techniques described in this disclosure. For example, in some implementations, wrapper classes can be provided for some commonly used standard classes, such as HashMaps. In some implementations, an alternative wrapper class can be defined (e.g., a wrapper class referred to, for example, as a MultiTenantHashMap). Such a class can be a "HashMap of HashMaps" keyed by the tenant identifier. The wrapper class can therefore provide the same interface commands as the standard HashMap class (e.g., get, put, keyset, entryset, etc.), but also can override some or all of the methods of the standard HashMap class to first require a determination of the relevant tenant context using thread-local storage, before performing the operations (e.g., traditional HashMap methods) on the HashMap associated with the correct tenant.

Engineering effort and risk level also can be reduced through the use of generic containers that can be used to save and/or retrieve any object for a tenant. For example, a container can be implemented using a HashMap of objects keyed by a tenant identifier. The container can determine the tenant context by examining thread-local storage and then can save or retrieve any object associated with that tenant. In some implementations, type safety can be provided using Generics features that are included with many modern programming languages, such as Java. Thus, implementing wrapper classes and containers can allow an application or other system to be converted from single-tenant to multi-tenant with minimal changes to the initial underlying computer code.

At least one aspect of this disclosure is directed to a system for accessing a plurality of single-tenant databases comprising a multi-tenant aware cluster manager in communication with a plurality of instances of single-tenant databases. The multi-tenant aware cluster manager can be configured to establish a uniform resource locator (URL) unique for each tenant of a plurality of tenants to access the cluster manager. Each of the plurality of instances of single-tenant databases can include data for a corresponding tenant of the plurality of tenants. The multi-tenant aware cluster manager can be configured to receive a request from a client to access a database corresponding to the first tenant. The request can include the URL established for the first tenant. The multi-tenant aware cluster manager can be configured to identify the first tenant based at least on the URL of the request. The multi-tenant aware cluster manager can be configured to obtain, responsive to identification of the first tenant, a tenant context of the first tenant from a storage. The multi-tenant aware cluster manager can be configured to access, using the first tenant context and responsive to the request, a first instance of the plurality of instances of the single-tenant databases corresponding to the first tenant.

In some implementations, the tenant context can include one of information to access the first instance of the single-tenant database or information on a state of the first tenant in connection with use of the first instance of the single-tenant database. In some implementations, the tenant context can include one of a tenant identifier identifying the first tenant or a hash map keyed by the tenant identifier.

In some implementations, the multi-tenant aware cluster manager can be further configured to obtain the tenant context via storage comprising thread-local storage. The cluster manager can store a plurality of tenant contexts in a plurality of thread-local storages corresponding to a specific tenant. In some implementations, the multi-tenant aware cluster manager can be further configured to identify the tenant context based on information stored in the thread-local storage. The cluster manager can maintain a plurality of tenant contexts in a corresponding thread-local storage.

In some implementations, the multi-tenant aware cluster manager can be further configured to manage a plurality of objects corresponding to each tenant of the plurality of tenants. The plurality of objects can be used for one of saving or tracking one or more states corresponding to each tenant of the plurality of tenants. In some implementations, the multi-tenant aware cluster manager can be further configured to access the plurality of objects via a container implemented using a hash map of the plurality of objects keyed by a tenant identifier. In some implementations, the multi-tenant aware cluster manager can be further configured to access the first instance of the plurality of instances of the single-tenant databases corresponding to the first tenant by accessing application programming interfaces of the cluster manager using one of the tenant identifier or the tenant context stored in a local-thread storage for the first tenant. In some implementations, the multi-tenant aware cluster manager can be further configured to access the first instance of the plurality of instances of the single-tenant databases corresponding to the first tenant by accessing data from the first instance of the single-tenant database. Each instance of the plurality of single-tenant databases can be constructed to store data for a single tenant.

In some implementations, the multi-tenant aware cluster manager can be further configured to receive the request from the client by receiving a hypertext transfer protocol (HTTP) request from the client. The HTTP request can include a header including the URL established for the first tenant.

Another aspect of this disclosure is directed to a method for accessing a plurality of single-tenant databases using a multi-tenant aware cluster manager. The method can include establishing, by a cluster manager in communication with a plurality of instances of single-tenant databases, a uniform resource locator (URL) unique for each tenant of a plurality of tenants to access the cluster manager. Each of the plurality of instances of single-tenant databases can include data for a corresponding tenant of the plurality of tenants. The method can include receiving, by the cluster manager, a request from a client to access a database corresponding to the first tenant. The request can include the URL established for the first tenant. The method can include identifying, by the cluster manager, the first tenant based at least on the URL of the request. The method can include obtaining, by the cluster manager responsive to identification of the first tenant, a tenant context of the first tenant from a storage. The method can include accessing, by the cluster manager using the first tenant context and responsive to the request, a first instance of the plurality of instances of the single-tenant databases corresponding to the first tenant.

In some implementations, the tenant context can include one of information to access the first instance of the single-tenant database or information on a state of the first tenant in connection with use of the first instance of the single-tenant database. In some implementations, the tenant context can include one of a tenant identifier identifying the first tenant or a hash map keyed by the tenant identifier.

In some implementations, the method can include obtaining, by the cluster manager, the tenant context via storage comprising thread-local storage. The cluster manager can store a plurality of tenant contexts in a plurality of thread-local storages. Each thread-local storage of the plurality of thread-local storages corresponds to a specific tenant. In some implementations, the method can include identifying, by the cluster manager, the tenant context based on information stored in the thread-local storage. The cluster manager can maintain a plurality of tenant contexts in a corresponding thread-local storage.

In some implementations, the method can include managing, by the cluster manager, a plurality of objects corresponding to each tenant of the plurality of tenants. The plurality of objects can be used for one of saving or tracking one or more states corresponding to each tenant of the plurality of tenants. In some implementations, the method can include accessing, by the cluster manager, the plurality of objects via a container implemented using a hash map of the plurality of objects keyed by a tenant identifier.

In some implementations, the method can include accessing, by the cluster manager, application programming interfaces of the cluster manager using one of the tenant identifier or the tenant context stored in a local-thread storage for the first tenant. In some implementations, the method can include accessing, by the cluster manager, data from the first instance of the single-tenant database. Each instance of the plurality of single-tenant databases can be constructed to store data for a single tenant. In some implementations, the method can include receiving, by the cluster manager, a hypertext transfer protocol (HTTP) request from the client. The HTTP request can include a header including the URL established for the first tenant.

Another aspect of this disclosure is directed to a method for converting a single-tenant system to a multi-tenant system. The method can include receiving, by a device, an application programming interface (API) request to perform an operation corresponding to a first tenant of a plurality of tenants. The method can include determining, by the device, from an HTTP host header in the API request, a first tenant identifier identifying the first tenant. The method can include recording, by the device, the first tenant identifier in a thread-local storage corresponding to the API request. The method can include identifying, by the device, using the first tenant identifier retrieved from the thread-local storage as a key, one of a class of the first tenant from a wrapper class or an object of the first tenant from a container. The wrapper class and the container can be provisioned by the device to provide multi-tenancy. The method can include performing, by the device, the operation of the API request on the identified class or object of the first tenant.

In some implementations, the method can further include receiving, by the device, a second API request to perform a second operation corresponding to a second tenant of a plurality of tenants. The method also can include determining, by the device, from an HTTP host header in the second API request, a second tenant identifier identifying the second tenant. The method also can include recording, by the device, the second tenant identifier in a second thread-local storage corresponding to the second API request. The method also can include identifying, by the device, using the second tenant identifier retrieved from the second thread-local storage as a key, one of a class of the second tenant from the wrapper class or an object of the second tenant from the container. The method also can include performing, by the device, the second operation of the second API request on the identified class or object of the second tenant.

Another aspect of this disclosure is directed to a method for converting a single-tenant system to a multi-tenant system. The method can include receiving, by a device, an application programming interface (API) request to perform an operation corresponding to a first tenant of a plurality of tenants. The method can include determining, by the device, from an HTTP host header in the API request, a first tenant identifier identifying the first tenant. The method can include recording, by the device, the first tenant identifier in a thread-local storage corresponding to the API request. The method can include identifying, by the device, using the first tenant identifier retrieved from the thread-local storage as a key, a class of the first tenant from a wrapper class provisioned by the device to provide multi-tenancy. The method can include performing, by the device, the operation of the API request on the identified class of the first tenant.

Another aspect of this disclosure is directed to a method for converting a single-tenant system to a multi-tenant system. The method can include receiving, by a device, an application programming interface (API) request to perform an operation corresponding to a first tenant of a plurality of tenants. The method can include determining, by the device, from an HTTP host header in the API request, a first tenant identifier identifying the first tenant. The method can include recording, by the device, the first tenant identifier in a thread-local storage corresponding to the API request. The method can include identifying, by the device, using the first tenant identifier retrieved from the thread-local storage as a key, an object of the first tenant from a container. The container can be provisioned by the device to provide multi-tenancy. The method can include performing, by the device, the operation of the API request on the identified object of the first tenant.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
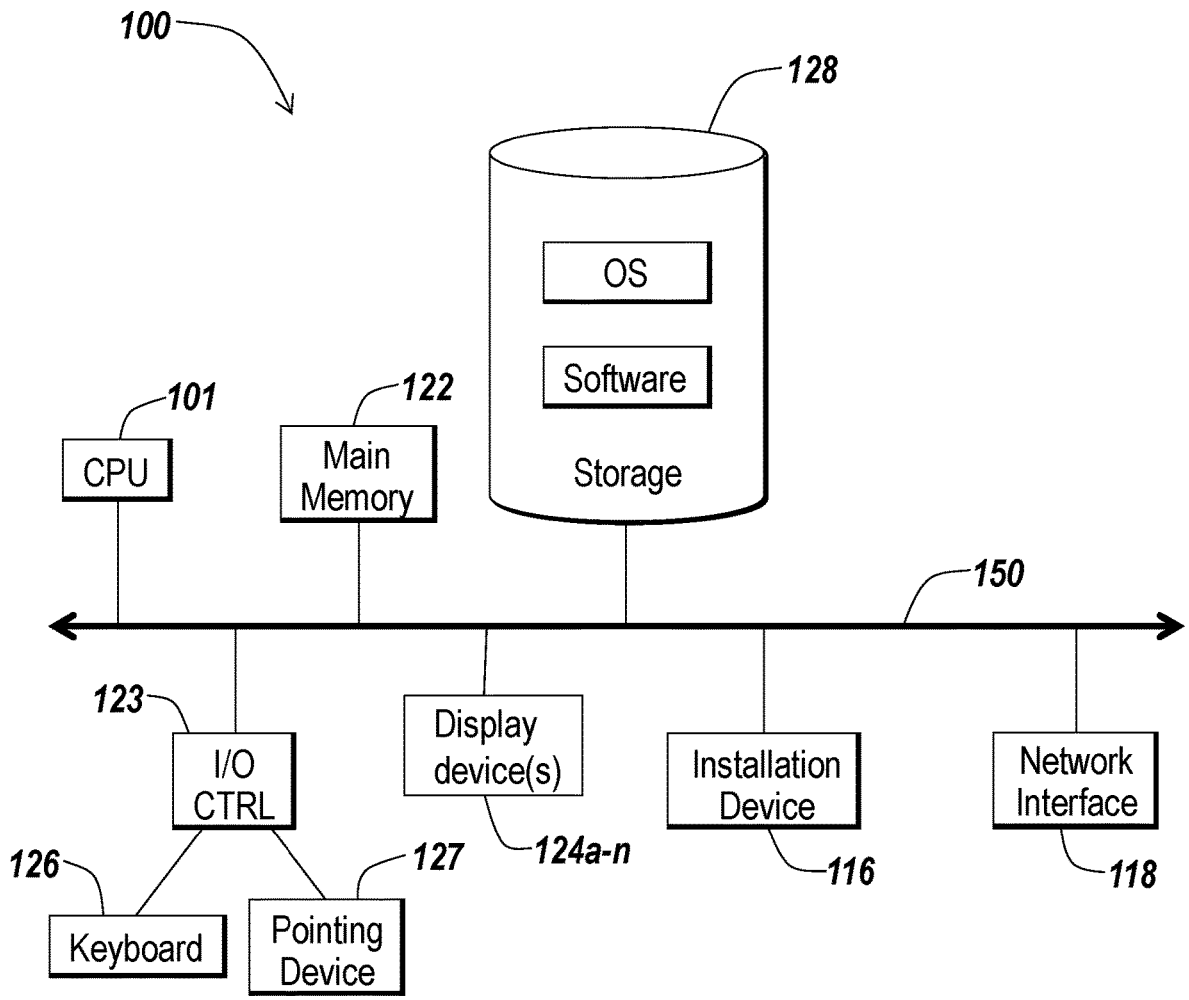
FIGS. 1A-1D are block diagrams of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for converting a single-tenant system to a multi-tenant system.

A. Computing Environment

Figure 1B:
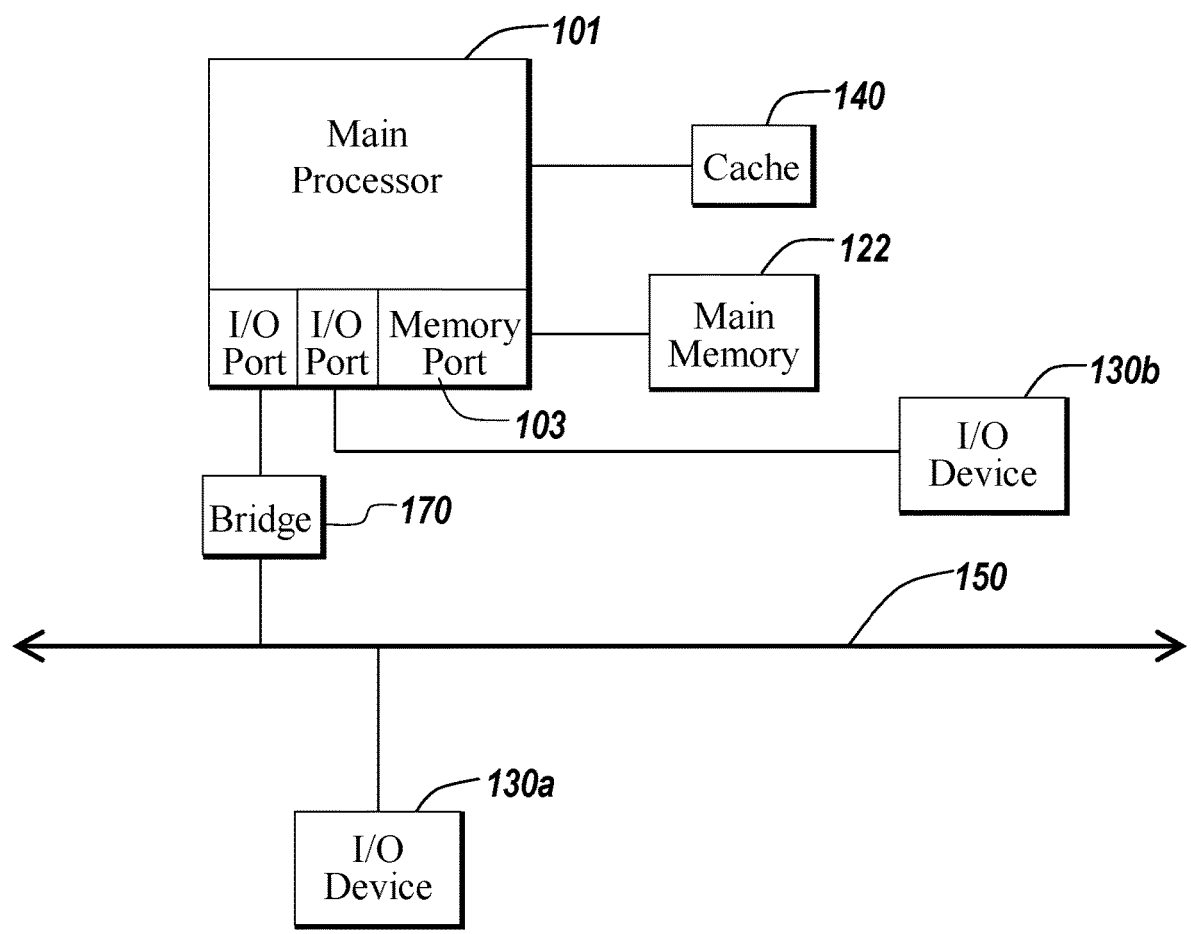

Prior to discussing the specifics of embodiments of the systems and methods of an appliance and/or client, it may be helpful to discuss the computing environments in which such embodiments may be deployed. FIGS. 1A and 1B depict block diagrams of a computing device 100 useful for practicing embodiments of the systems and devices described further below in Section B. As shown in FIGS. 1A and 1B, each computing device 100 includes a central processing unit 101, and a main memory unit 122. As shown in FIG. 1A, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N. Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 101 communicates with main memory 122 via a system bus 150 (described in more detail below).

FIG. 1B depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1B, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1B depicts an embodiment of a computer 100 in which the main processor 101 communicates directly with I/O device 130b via HyperTransport, Rapid I/O, or InfiniBand. FIG. 1B also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device 128, such as one or more hard disk drives or redundant arrays of independent disks, for storing an operating system and other related software, and for storing application software programs. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1C:
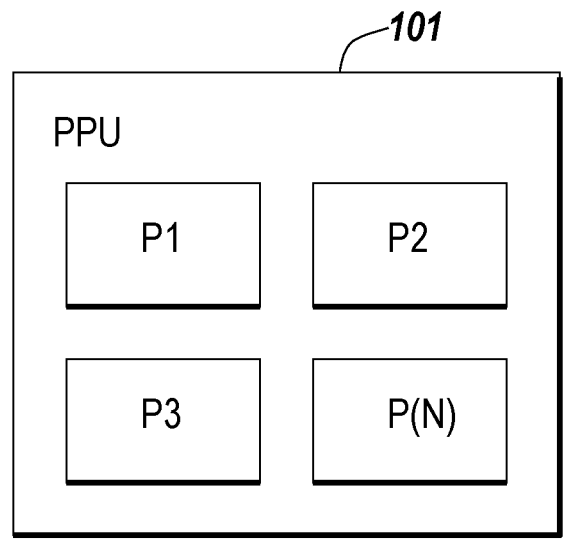

As shown in FIG. 1C, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1D:
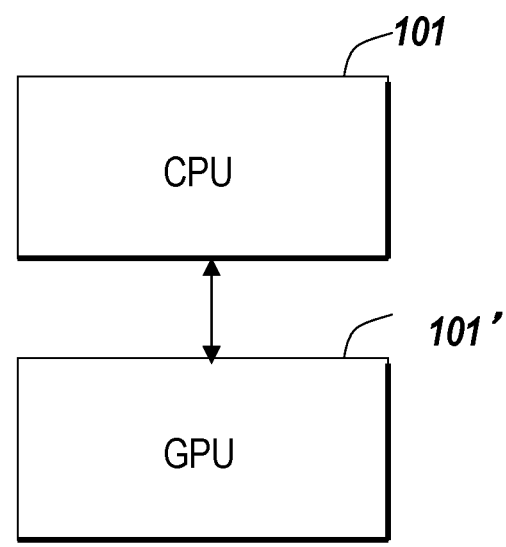

In some embodiments, the computing device 100 may comprise a graphics processing unit. In one of these embodiments depicted in FIG. 1D, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Converting a Single-Tenant System to a Multi-Tenant System

This disclosure describes patterns that can be used for converting a large legacy single-tenant system into a multi-tenant system, while minimizing changes to the code-base of the original single-tenant system. The techniques described in further detail below also can facilitate easier migrations from a single-tenant system to a multi-tenant system. In general, a tenant may be a customer organization, such as a business or other entity, that makes use of a system, for example via a subscription to the system or to a service provided by the system.

The techniques described in this disclosure can be particularly useful for modifying large, complex applications or computing systems that initially only support single-tenancy. Such applications and systems may include thousands or millions of lines of code, which, for object-oriented programming languages, may define hundreds, thousands, or millions of classes, methods, objects, variables, and databases that can be interrelated in complicated ways. In some implementations, such an application may be a mobile device management (MDM) application, a mobile application management (MAM) application, a mobile content management (MCM) application, or any other type or form of enterprise mobility management software or system. For example, such a product may have initially been developed to be deployed as a single-tenant application on-premises at a physical site owned or otherwise managed by an end user (e.g., a business entity or other organization). However, due to changes in the marketplace for such products, there may be customer demand for a similar system that is deployed remotely (e.g., cloud-based or otherwise distributed across a computer network, such as the Internet). There also may be demand for such a system that supports multi-tenancy functionality. Described further below are concepts that can allow an existing single-tenant application or system to be converted into an application or system that supports multi-tenancy (sometimes also referred to as a "tenant-aware" system). In some implementations, a single instance of such an application or system can be modified such that it can service multiple tenants that remain isolated from one another. The modifications as described in this disclosure can reduce the number of code changes and the level of risk involved in the transition from a single-tenant environment to a multi-tenant environment.

The present disclosure describes a variety of techniques for the efficient conversion from a single-tenant system to a multi-tenant system. For example, an application tier of the initial system can be made multi-tenant, while a data tier remains single-tenant. This can reduce the engineering effort required for the conversion, while still enabling easy migrations to a multi-tenant system for a customer or other end user. In some implementations, existing application programming interface (API) parameters for the legacy single-tenant application can be used for determining tenant context (e.g., an identification of a particular one of multiple tenants associated with an API request) in the multi-tenant application. As a result, no new parameters for the API are required. In some implementations, the tenant context in the multi-tenant system can be propagated throughout the system using thread-local storage. In addition, wrapper classes or containers (or both) can be introduced. The wrapper classes and containers can be tenant-aware, and can require only relatively small changes to the existing code of the single-tenant system, as compared to the relatively larger changes that may be required if conventional classes were used to convert the single-tenant system to a multi-tenant system.

In some implementations, the architecture for multi-tenancy can involve a single instance of an application that can multiplex across multiple databases based on a plurality of tenants to support multi-tenant functionality. With this approach, changes to the database schema can be reduced. For example, there may be no need to modify the database schema to require a tenant identifier for each of the plurality of tenants. This can also allow for the migration of a legacy single-tenant environment to a multi-tenant environment without having to build complex migration tools.

As described briefly above, tenant identification may not require any additional parameters (e.g., a tenant identification parameter) to be included in every API request. Instead, a header included in the API request, such as a hypertext transfer protocol (HTTP) host header, can be used to identify the respective tenant associated with the request. In some implementations, this can be achieved by providing each tenant with a unique uniform resource locator (URL). In some implementations, a tenant making an API request is still required to provide other appropriate credentials for accessing an API at its respective URL. Thus, this approach does not require a change to the API, thereby eliminating any need to modify any client-side applications that may make use of the existing API.

Many large software applications include multiple layers of code that are invoked in order to service an API request. For a multi-tenant system, the tenant context (e.g., an identification of the particular tenant associated with an API request) may be required by more than one layer of code, so that the actions of the API request can be performed in the context of the correct tenant. The tenant context also can be required for simple tasks like logging messages that are to be tagged with the right tenant identifier. However, changing the API signatures of all of the layers of code to pass in the tenant context information can be difficult. To address this issue, in some implementations, the tenant context for an API request can be stored in thread-local storage at the entry point (e.g., the first layer of code invoked during the API request) such that it can be retrieved easily by any of the code present in the other layers of the application during the processing of the API request.

Some large applications make frequent use of standard collections or other data structures, such as HashMaps, Lists, Queues, and Stacks. For example, such data structures may be useful for saving and/or tracking variables in memory. Typically, these are singleton objects that save and/or track the state for a tenant. Thus, in a multi-tenant environment, multiple instances of these objects may be required, and therefore additional code must be written to manage the lifecycle of these instances, as well as for finding the right instance based on the tenant context. This results in increased engineering effort, as well as increased risk for introducing regressions when converting to a multi-tenant system. However, engineering effort and risk level can both be reduced using the techniques described in this disclosure. For example, in some implementations, wrapper classes can be provided for some commonly used standard classes, such as HashMaps. In some implementations, an alternative wrapper class can be defined (e.g., a wrapper class referred to, for example, as a MultiTenantHashMap). Such a class can be a "HashMap of HashMaps" keyed by the tenant identifier. The wrapper class can therefore provide the same interface commands as the standard HashMap class (e.g., get, put, keyset, entryset, etc.), but also can override some or all of the methods of the standard HashMap class to first require a determination of the relevant tenant context using thread-local storage, before performing the operations (e.g., traditional HashMap methods) on the HashMap associated with the correct tenant.

Engineering effort and risk level also can be reduced through the use of generic containers that can be used to save and/or retrieve any object for a tenant. For example, a container can be implemented using a HashMap of objects keyed by a tenant identifier. The container can determine the tenant context by examining thread-local storage and then can save or retrieve any object associated with that tenant. In some implementations, type safety can be provided using Generics features that are included with many modern programming languages, such as Java. Thus, implementing wrapper classes and containers can allow an application or other system to be converted from single-tenant to multi-tenant with minimal changes to the initial underlying computer code.

Figure 2:
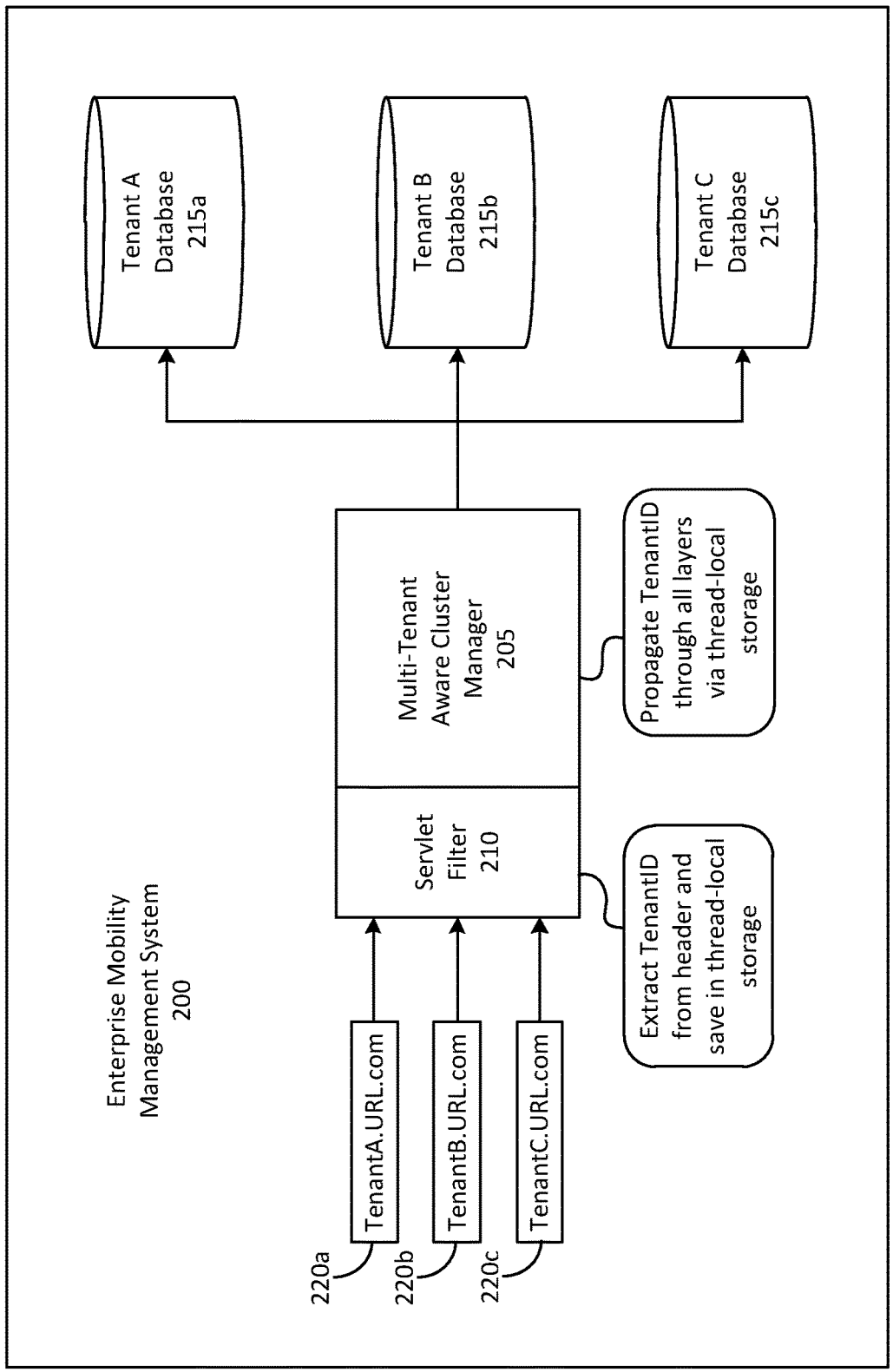
FIG. 2 is a block diagram of an example enterprise mobility management system, according to an illustrative implementation.

FIG. 2 is a block diagram of an example enterprise mobility management system (EMMS) 200, according to an illustrative implementation. In various implementations, the EMMS 200 can be any device, system, or application configured to support mobile device management (MDM), mobile application management (MAM), or mobile content management (MCM). In some implementations, the EMMS 200 can be or can include an instance of the XenMobile® product manufactured by Citrix Systems, Inc. of Ft. Lauderdale Fla. In some implementations, the EMMS 200 can be or can include a computing device such as the computing device 100 shown in FIGS. 1A and 1B and described above in Section A. The EMMS 200 includes a multi-tenant aware cluster manager 205 (sometimes referred to as a cluster manager 205), a servlet filter 210, and three databases 215*a*-215*c* (generally referred to as databases 215). Each database 215 is associated with a respective tenant, labeled Tenant A, Tenant B, and Tenant C. It should be noted that the EMMS system 200 may initially be configured to support only a single tenant, and can be modified according to the techniques described further below to support multiple tenants. It should also be noted that, while the EMMS 200 is shown in FIG. 2 as capable of supporting three tenants for illustrative purposes, in other implementations the EMMS 200 may be configured to support more or fewer tenants without departing from the scope of this disclosure. Also shown in FIG. 2 are three API requests 220*a*-220*c* (generally referred to as API requests 220), each of which is associated with a respective on of the tenants labeled Tenant A, Tenant B, and Tenant C. The EMMS 200 is configured such that each of the API requests 220 can be processed using information (e.g., in the databases 215) corresponding to the correct tenant.

As described above, the EMMS 200 may initially be configured to support only a single tenant. As such, API requests such as the API requests 220 may not initially be formatted to include any form of tenant identification, as such an identification would be unnecessary in an environment in which only a single tenant exists. It can be difficult and time-consuming to reconfigure the EMMS 200 to require a different format for API requests, as such a change could require many corresponding changes to the various classes, methods, and other forms of data defined by the computer code that makes up the cluster manager 205. To address this issue while still providing support for multiple tenants, the EMMS 200 can be configured to multiplex the API requests 220 across the three databases 215 based on the tenant context of each API request.

The multiplexing functionality is implemented in part by the servlet filter 210. Each tenant is provided with a unique URL, which the tenants can use as a source address for sending API requests. In the example shown in FIG. 2, Tenant A is associated with the URL "TenantA.URL.com," Tenant B is associated with the URL "TenantB.URL.com," and Tenant C is associated with the URL "TenantC.URL.com." The servlet filter 210 is configured to extract a tenant identifier (sometimes also referred to in this disclosure as a TenantID) from each API request 220 that it receives. For example, as shown, the TenantID for each tenant can correspond to the first component of the hostname of that tenant's respective URL. The servlet filter 210 can be configured to scan, monitor, parse, or otherwise process the URL from which an API request 220 is received to determine the TenantID of the tenant that initiated the API request based on this URL naming pattern. For example, in some implementations, an API request may be formatted as an HTTP request. Because standard HTTP requests include a host header having an indication of the source address of the originating device, every such API request will include the URL of its originating tenant. The servlet filter 210 can include computer instructions configured to parse the host header of an API request 220 to extract the host header before the API request is processed. In other implementations, the API requests 220 may be formatted differently, and the servlet filter 210 can be configured appropriately to parse the particular format of the API requests 220.

In some implementations, the servlet filter 210 passes each received API request 220 to the cluster manager 205, which can be configured to process the API request 220. However, as described above, there may be several layers of code (e.g., methods or functions that invoke other methods or functions) used to implement the cluster manager 205, and each layer may require the TenantID in order for an API request 220 to be processed appropriately. To ensure that each layer of code included in the cluster manager 205 has access to the TenantID, the servlet filter 210 can store information corresponding to the TenantID of a received API request in thread-local storage prior to forwarding the API request to the cluster manager 205. When processing an API request 220, each layer of code within the cluster manager 205 can retrieve the TenantID for the API request 220 from thread local storage to determine which tenant is associated with the API request 220. Thus, the cluster manager 205 propagates the TenantID for the API request 220 through all of its code layers via the information stored in the thread-local storage. As a result, actions associated with an API request 220 can be taken in the context of the appropriate tenant. For example, an API request from Tenant A that seeks to retrieve information from a database (e.g., using a "get" command) can cause the cluster manager 205 to retrieve the requested information from the correct database (i.e., the Tenant A database 215), even though the format of the API request 220 and the code included within the cluster manager 205 has not been altered relative to that used for processing requests in a single-tenancy context.

Figure 3:
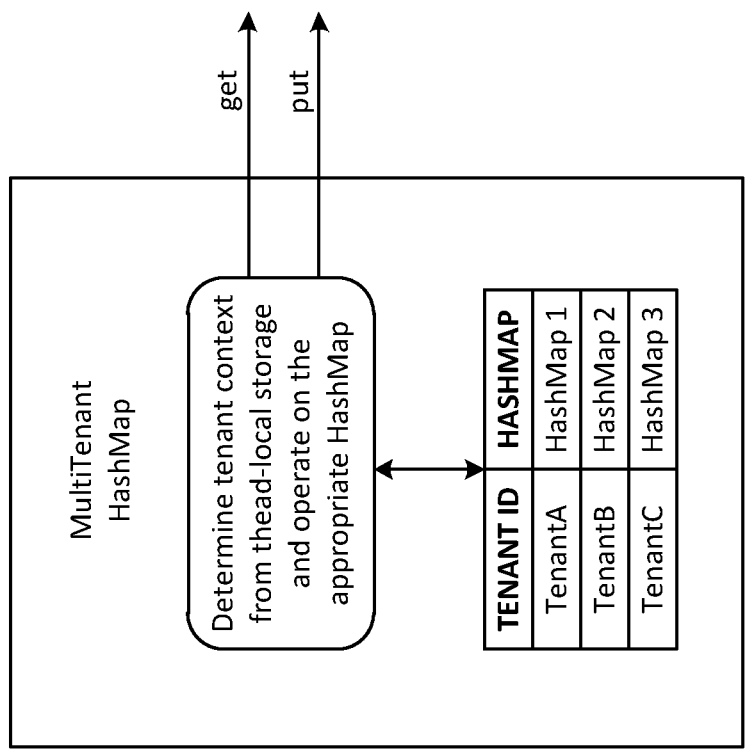
FIG. 3 is a block diagram representation of an example wrapper class that can be used in the system of FIG. 2, according to an illustrative implementation.

FIG. 3 is a block diagram representation of an example wrapper class 300 that can be used in the system of FIG. 2, according to an illustrative implementation. Applications such as the cluster manager 205 shown in FIG. 2 may use various standard data structures, such as HashMaps, Lists, Queues, and Stacks, for saving and tracking information related to a tenant, such as the values associated with particular variables for the tenant. However, in a multi-tenancy context, multiple instances of these data structures (e.g., one for each tenant) must be maintained, and there must be a way to locate the correct instance of each data structure during the processing of an API request for each tenant. The wrapper class 300 can be used to reduce the engineering effort and risk level of accurately maintaining and tracking multiple instances of each such data structure.

As shown, the wrapper class 300 is implemented as a "HashMap of HashMaps," which is keyed by TenantID. Thus, in the example illustrated in FIG. 3, HashMap 1 is a HashMap associated with Tenant A, HashMap 2 is a HashMap associated with Tenant B, and HashMap 3 is a HashMap associated with Tenant C. The wrapper class 300 is used to store each of the HashMaps 1-3, as well as their associations with their respective tenants.

The wrapper class 300 can provide the same interface as its underlying conventional class (i.e., the HashMap). For example, the wrapper class 300 can process the same types of commands typically used with a conventional HashMap, such as 'get,' 'put,' 'keyset,' 'entryset', etc. In addition, the wrapper class 300 can be configured to override the standard functionality of the conventional HashMap class by first requiring a determination of the tenant context before performing any requested function. This can ensure that every function is performed on the correct HashMap for each tenant. As described above, the EMMS 200 shown in FIG. 2 can store the tenant context (i.e., the TenantID associated with the tenant who initiated an API request) in thread-local storage. Thus, the wrapper class 300 can retrieve the tenant context from thread local storage when an API request is received, and can map the tenant context to the correct HashMap before any function is performed. Then, the wrapper class 300 performs the requested function on the appropriate HashMap.

It should be understood that, while only 'get' and 'put' commands are shown as being performed by the wrapper class 300 for illustrative purposes, in some implementations the wrapper class 300 is configured to perform other commands, such as any of the commands associated with the conventional HashMap class. It should also be understood that, although the wrapper class 300 is illustrated as a "HashMap of HashMaps," in other implementations, different wrapper classes can be used without departing from the scope of this disclosure. For example, the other wrapper classes may be implemented to override the functionality of different conventional classes, such as Lists, Queues, and Stacks. In such implementations, the wrapper class can be configured to first determine the tenant context of an API request by retrieving the TenantID from thread-local storage before performing an action associated with the thread local storage, to ensure that the action is performed on the correct class associated with the tenant that initiated the API request.

Figure 4:
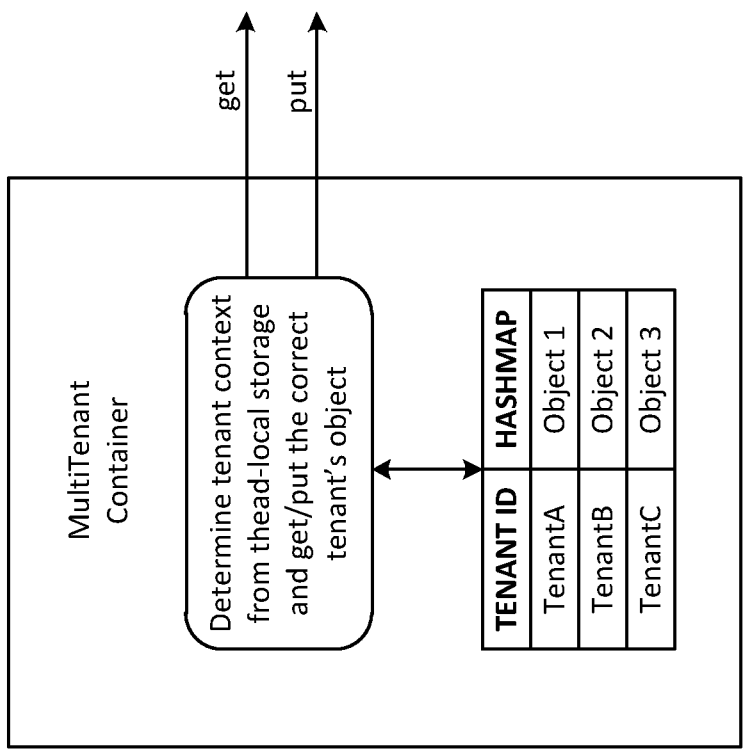
FIG. 4 is a block diagram representation of an example container that can be used in the system of FIG. 2, according to an illustrative implementation.

FIG. 4 is a block diagram representation of an example container 400 that can be used in the system of FIG. 2, according to an illustrative implementation. Similar to the wrapper class 300 shown in FIG. 3, the container 400 can be used to reduce the engineering effort and risk level associated with maintaining and tracking multiple instances of objects that are each associated with a respective tenant.

As shown, the container 400 is implemented as a "HashMap of objects," which is keyed by TenantID. Thus, in the example illustrated in FIG. 4, object 1 is an object associated with Tenant A, object 2 is an object associated with Tenant B, and object 3 is an object associated with Tenant C. The container 400 is used to store each of the objects 1-3, as well as their associations with their respective tenants.

The container 400 can allow objects to be manipulated (e.g., saved, retrieved, modified, etc.) correctly based on the tenant associated with an API request that corresponds to the command to manipulate each object. For example, when a request to manipulate an object is received, the container 400 first determines the tenant context for the request in a manner similar to that described above in connection with the wrapper class 300 (i.e., by determining the TenantID associated with the request by examining the thread-local storage). The container 400 then performs the requested object manipulation on the object associated with the tenant that initiated the request.

Figure 5:
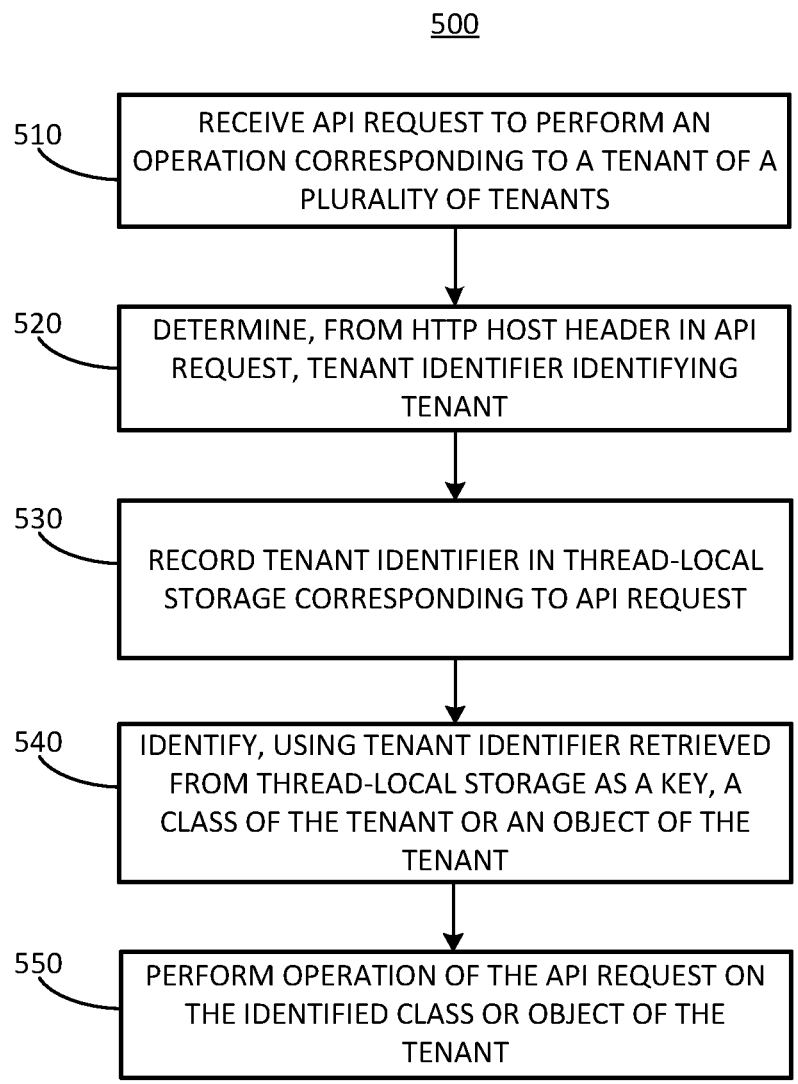
FIG. 5 is a flowchart of an example method for converting a single-tenant system to a multi-tenant system, according to an illustrative implementation.

FIG. 5 is a flowchart of an example method 500 for converting a single-tenant system to a multi-tenant system, according to an illustrative implementation. In brief overview, the method 500 includes receiving an API request to perform an operation corresponding to a tenant of a plurality of tenants (step 510). The method 500 includes determining, from an HTTP host header in the API request, a tenant identifier identifying the tenant (step 520). The method 500 includes recording the tenant identifier in a thread-local storage corresponding to the API request (step 530). The method 500 includes identifying, using the tenant identifier retrieved from the thread-local storage as a key, one of a class of the tenant from a wrapper class or an object of the tenant from a container (step 540). The method 500 includes performing the operation of the API request on the identified class or object of the tenant (step 550).

Referring again to FIG. 5, and in greater detail, a device or system (such as the EMMS 200 shown in FIG. 2) can receive an API request to perform an operation corresponding to a tenant of a plurality of tenants (step 510). In some implementations, the device can be configured to support MDM, MAM, or MCM. The plurality of tenants may include any number of tenants, each of which may be or may include another device or an instance of a software application. The API request can be any request for a resource, such as data, hosted by the device receiving the API request. In some implementations, the API request can be formatted as an HTTP request, and the requested resource can be uniquely associated with the tenant.

The device can determine, from an HTTP host header in the API request, a tenant identifier identifying the tenant (step 520). In some implementations, each of the plurality of tenants is provided with a unique URL, which the tenants can use as a source address for sending API requests. The URLs for the plurality of tenants may be assigned according to a common format. For example, each tenant may be assigned a URL that includes a unique TenantID parameter as a component of the host name of the URL. Thus, the device can extract the tenant identifier from the host header of the API request by parsing the host header according to the common format of the URLs assigned to the plurality of tenants. In some implementations, the device may execute a servlet filter, such as the servlet filter 210 shown in FIG. 2, configured to perform the extraction of the TenantID from the API request, which can correspond to the tenant identifier.

The device can record the tenant identifier in a thread-local storage corresponding to the API request (step 530). In some implementations, this can be performed by the servlet filter executing on the device. The thread-local storage can correspond to any type and form of memory, such as RAM, cache memory, or a hard disk drive. In general, the thread-local storage in which the tenant identifier is saved can be any location in memory that is accessible to a thread of computer instructions associated with the processing of the received API request. Thus, storing the tenant identifier in thread-local storage can allow various functions or methods associated with the processing of the API request to have access to the tenant identifier.

The device can identify, using the tenant identifier retrieved from the thread-local storage as a key, one of a class of the tenant from a wrapper class or an object of the tenant from a container (step 540). In some implementations, the wrapper class and the container can be provisioned by the device to provide multi-tenancy. For example, the wrapper class may be similar to the wrapper class 300 shown in FIG. 3, which includes a "HashMap of HashMaps," each keyed by a tenant identifier. Therefore, the device can identify the class by retrieving the tenant identifier from the thread-local storage, and identifying the class whose key matches the tenant identifier within the wrapper class.

Similarly, in the case of a container, the container may be similar to the container 400 shown in FIG. 4, which includes a "HashMap of objects," each keyed by a tenant identifier. Thus, the device can identify the object by retrieving the tenant identifier from the thread-local storage, and identifying the object whose key matches the tenant identifier within the container.

The device can perform the operation of the API request on the identified class or object of the tenant (step 550). The operation can be any operation associated with the API request, such as function call or execution of a method. The operation is performed on the class or object identified in step 540 to ensure that API requests originating from the tenant are processed accordingly, using only those classes and objects that are associated with the tenant. In some implementations, the operation may include multiple actions performed across multiple layers of code (i.e., functions or methods that invoke other functions or methods). To ensure that each layer of code operates on the correct identified class or object, each layer of code can successively retrieve the tenant identifier from the thread-local storage and independently identify the appropriate class or object associated with the tenant identifier, until the operation has been fully performed on the identified class or object.

In some implementations, steps similar to those of the method 500 can be repeated multiple times for additional API requests, which may originate from different tenants. For example, in some implementations the method 500 can further include receiving, by the device, a second API request to perform a second operation corresponding to a second tenant of a plurality of tenants. The second API request can be any request for a resource, such as data, hosted by the device receiving the second API request. Like the API request, the second API request can be formatted as an HTTP request, and the requested resource can be uniquely associated with the second tenant that initiates the second API request.

The method 500 also can include determining, by the device, from an HTTP host header in the second API request, a second tenant identifier identifying the second tenant. For example, the device can extract the second tenant identifier from the host header of the second API request by parsing the host header according to the common format of the URLs assigned to the plurality of tenants, as described above. In some implementations, the device can record the second tenant identifier in a second thread-local storage corresponding to the second API request. The second thread-local storage in which the second tenant identifier is saved can be different from the thread-local storage in which the tenant identifier was saved in step 530, thereby ensuring that the methods or functions for each of the API request and the second API request are performed on the correct classes or objects.

The method 500 also can include identifying, by the device, using the second tenant identifier retrieved from the second thread-local storage as a key, one of a class of the second tenant from the wrapper class or an object of the second tenant from the container. As described above, the wrapper class and the container can include HashMaps of generic classes or objects, respectively, which are keyed by a tenant identifier. Therefore, the device can identify the correct class or object by retrieving the second tenant identifier from the thread-local storage, and identifying the class or object whose key matches the second tenant identifier within the wrapper class or the container. The device can then perform the second operation of the second API request on the identified class or object of the second tenant. This can ensure that the second API request originating from the second tenant is processed accordingly, using only those classes and objects that are associated with the second tenant.

Figure 6:
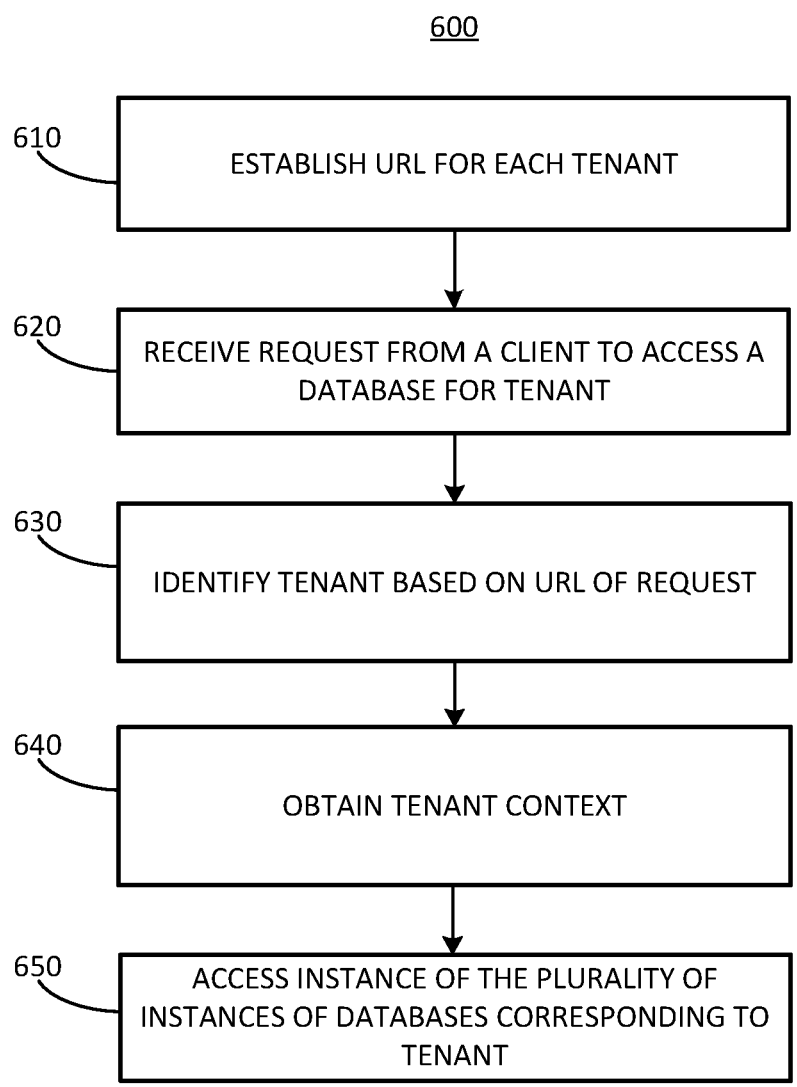
FIG. 6 is a flowchart of an example method for accessing a plurality of single-tenant databases using a multi-tenant aware cluster manager, according to an illustrative implementation.

FIG. 6 is a flowchart of an example method 600 for accessing a plurality of single-tenant databases using a multi-tenant aware cluster manager, according to an illustrative implementation. In brief overview, the method 600 includes establishing a URL for each tenant of a plurality of tenants (step 610). The method 600 includes receiving a request from a client to access a database for a tenant of the plurality of tenants (step 620). The method 600 includes identifying the tenant based on a URL of the request (step 630). The method 600 includes obtaining a tenant context for the tenant (step 640). The method 600 includes accessing an instance of the plurality of instances of databased corresponding to the tenant (step 650).

Referring again to FIG. 6, and in greater detail, a device or system (such as the EMMS 200 shown in FIG. 2, or a component of the EMMS 200 such as the cluster manager 205) can establish a URL for each tenant of a plurality of tenants. In some implementations, each URL can be unique from the others, such that the URL established for any given tenant uniquely identifies that tenant from the other tenants. In some implementations, the cluster manager 205 can also transmit an indication of the established URL to each tenant of the plurality of tenants. The tenants can use their respective URL, for example, as the source address for communications they send to the cluster manager 205.

The cluster manager 205 can receive a request from a client to access a database for a tenant of the plurality of tenants (step 620). The request can be any request relating to the database, such as a request to write data to the database or a request to read data from the database. In some implementations, the request can include the URL established for the tenant. For example, the request can include a header or other information block storing a source address for the request, the source can be the URL established for the tenant. In some implementations, the request can be formatted according to an API supported by the cluster manager 205. For example, the request can be an API request formatted as an HTTP request.

The cluster manager 205 can identify the tenant based on the URL of the request (step 630). In some implementations, each tenant may be assigned a URL that includes a unique TenantID parameter as a component of the host name of the URL. Thus, the cluster manager 205 can extract the tenant identifier from the host header of the API request by parsing the host header according to a common format of the URLs assigned to the plurality of tenants. In some implementations, the cluster manager 205 may execute or may be coupled to a servlet filter, such as the servlet filter 210 shown in FIG. 2, configured to perform the extraction of the TenantID from the request, which can correspond to the tenant identifier. In some implementations, the cluster manager 205 can record a tenant context for the tenant in a storage element, such as a thread-local storage corresponding to the request. For example, the tenant context may be or may include the tenant identifier, as well as other information associated with the tenant. The tenant context can include any information relating to accessing the instance of the single-tenant database or information relating to a state of the tenant for use in accessing the instance of the single-tenant database. In some implementations, the tenant context can include a hash map keyed by the tenant identifier.

The cluster manager 205 can obtain the tenant context of the tenant from storage (step 640). For example, the thread-local storage or other storage in which the tenant context is saved can be any location in memory that is accessible to a set of computer instructions associated with the processing of the request received in step 620. Thus, obtaining the tenant context from the storage can allow various functions or methods associated with the processing of the request to have access to the tenant context. The cluster manager 205 can access the instance of the plurality of instances of single-tenant databases that corresponds to the tenant, by using the tenant context (step 650). For example, the tenant context can include any information identifying the instance of the single-tenant databases, as well as any other information relating to accessing that instance, such as state information for the tenant or settings configured for the tenant. In some implementations, the cluster manager 205 can perform a write operation on the instance of the single-tenant databases. In some other implementations, the cluster manager 205 can perform a read operation on the instance of the single-tenant databases, and can return a value read from the database to the tenant or to the client associated with the tenant.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A system for accessing single-tenant databases comprising a multi-tenant aware cluster manager in communication with a plurality of instances of the single-tenant databases, the system comprising one or more processors and a memory element storing executable instructions, which when processed by the one or more processors cause the system to:

establish a uniform resource locator (URL) unique for each tenant of a plurality of tenants to access the cluster manager, each of the plurality of instances of the single-tenant databases comprising data for a corresponding tenant of the plurality of tenants;

maintain a plurality of objects corresponding to each tenant of the plurality of tenants, the plurality of objects used for at least one of saving or tracking one or more states corresponding to each tenant of the plurality of tenants;

receive a request from a client of a first tenant of the plurality of tenants to modify an object stored in a database corresponding to the first tenant, the request comprising the URL established for the first tenant as a source address of the request, the source address used for identifying a source of the request;

identify, from the source address of the request to modify the object stored in the database, a tenant context including a tenant identifier of the first tenant based at least on the URL of the request;

store, in a thread-local storage accessible to the cluster manager and responsive to identifying the tenant context from the request to modify the object stored in the database, the tenant context identifying the first tenant to propagate the tenant context through one or more layers of code of the cluster manager;

obtain, responsive to the request forwarded to the cluster manager, the tenant context of the first tenant from the thread-local storage;

access, using the tenant context stored in the thread-local storage, a first instance of the plurality of instances of the single-tenant databases corresponding to the first tenant; and access, via a container implemented using a hash map of the plurality of objects keyed by the tenant identifier, the object identified in the request using the tenant context stored in the thread-local storage to modify the object corresponding the request.

2. The system of claim 1, wherein the tenant context comprises one of information to access the first instance of the single-tenant databases or information on a state of the first tenant in connection with use of the first instance of the single-tenant databases.

3. The system of claim 1, wherein the one or more processors are further configured to cause the system to identify the tenant identifier based on information stored in a thread-local storage, the cluster manager maintaining a plurality of tenant contexts in a corresponding thread-local storage.

4. The system of claim 1, wherein the one or more processors are further configured to cause the system to access the first instance of the plurality of instances of the single-tenant databases corresponding to the first tenant by accessing application programming interfaces of the cluster manager using one of the tenant identifier or the tenant context stored in a local-thread storage for the first tenant.

5. The system of claim 1, wherein the one or more processors are further configured to cause the system to access the first instance of the plurality of instances of the single-tenant databases corresponding to the first tenant by accessing data from the first instance of the single-tenant databases, wherein each instance of the single-tenant databases is constructed to store data for a single tenant.

6. The system of claim 1, wherein the one or more processors are further configured to cause the system to receive the request from the client by receiving a hypertext transfer protocol (HTTP) request from the client, the HTTP request comprising a header including the URL established for the first tenant.

7. A method comprising:
(a) establishing, by one or more processors in communication with a plurality of instances of single-tenant databases, a uniform resource locator (URL) unique for each tenant of a plurality of tenants to access a cluster manager, each of the plurality of instances of the single-tenant databases comprising data for a corresponding tenant of the plurality of tenants;
(b) maintaining, by the one or more processors, a plurality of objects corresponding to each tenant of the plurality of tenants, the plurality of objects used for at least one of saving or tracking one or more states corresponding to each tenant of the plurality of tenants;
(c) receiving, by the one or more processors, a request from a client of a first tenant of the plurality of tenants to modify an object stored in a database corresponding to the first tenant, the request comprising the URL established for the first tenant as a source address of the request, the source address used for identifying a source of the request;
(d) identifying, by the one or more processors, from the source address of the request to modify the object stored in the database, a tenant context including a tenant identifier of the first tenant based at least on the URL of the request;
(e) storing, by the one or more processors, in a thread-local storage accessible to the cluster manager and responsive to identifying the tenant context from the request to modify the object stored in the database, the tenant context identifying the first tenant to propagate the tenant context through one or more layers of code of the cluster manager;
(f) obtaining, by the one or more processors responsive to the request forwarded to the cluster manager, the tenant context of the first tenant from the thread-local storage;
(g) accessing, by the one or more processors using the tenant context stored in the thread-local storage, a first instance of the plurality of instances of the single-tenant databases corresponding to the first tenant; and
(h) accessing, by the one or more processors, via a container implemented using a hash map of the plurality of objects keyed by the tenant identifier, the object identified in the request using the tenant context stored in the thread-local storage to modify the object corresponding the request.

8. The method of claim 7, wherein the tenant context comprises one of information to access the first instance of the single-tenant databases or information on a state of the first tenant in connection with use of the first instance of the single-tenant databases.

9. The method of claim 7, further comprising identifying, by the one or more processors, the tenant context based on information stored in a thread-local storage, the cluster manager maintaining a plurality of tenant contexts in a corresponding thread-local storage.

10. The method of claim 7, wherein (g) further comprises accessing, by the one or more processors, application programming interfaces of the cluster manager using one of the tenant identifier or the tenant identifier stored in a local-thread storage for the first tenant.

11. The method of claim 7, wherein (g) further comprises accessing, by the one or more processors, data from the first instance of the single-tenant databases, wherein each instance of the single-tenant databases is constructed to store data for a single tenant.

12. The method of claim 7, wherein (c) further comprises receiving, by the one or more processors, a hypertext transfer protocol (HTTP) request from the client, the HTTP request comprising a header including the URL established for the first tenant.

* * * * *